United States Patent Office 3,047,566
Patented July 31, 1962

3,047,566
6a,6a-DIHALO-6,7-METHYLENE STEROIDS
AND METHOD
Wagn Ole Godtfredsen, Copenhagen, and Sven Liisberg, Trorod, Denmark, assignors to Løvens Kemiske Fabrik Ved A. Kongsted, Ballerup, Denmark
No Drawing. Filed Jan. 7, 1960, Ser. No. 941
Claims priority, application Great Britain June 13, 1958
16 Claims. (Cl. 260—239.55)

This application is a continuation-in-part of our parent application, Serial No. 819,203, filed June 10, 1959, now abandoned.

The present invention relates to derivatives of $\Delta^4$-3-keto-steroids of the androstene series and the pregnene series, which are substituted with a dichloro- or a dibromo-methylene group.

The said $\Delta^4$-3-keto-dihalogenomethylene steroid compounds are hitherto unknown substances. Their structure has not yet been established, in so far as the carbon atom of the dihalogenated methylene group may be connected either with the carbon atom in the 6-position in the steroid molecule by a double bond (Formula I) or with both of the carbon atoms 6 and 7 in the steroid molecule, thus forming a 3-membered ring (Formula II):

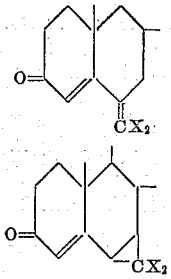

In these formulas X denotes chlorine or bromine.

For the sake of convenience the new compounds are denominated in accordance with the Formula II with the reservation that the establishment of the structure may possibly alter the nomenclature of the compounds. According to the nomenclature herein adopted for these compounds, 6a then designates a carbon atom which is connected with both carbon atoms 6 and 7 of the steroid molecule, and the compounds are consequently denominated 6a,6a-dichloro- and 6a,6a-dibromo-6,7-methylene steroids.

The compounds of the invention are useful intermediates in the synthesis of valuable therapeutically active steroid compounds. Thus, by catalytical hydrogenation in the presence of an acid-binding substance and subsequent treatment with a strong acid, such as hydrochloric acid or sulfuric acid, they will be transformed to the corresponding 6α-methyl-steroid compounds. It is well known that the introduction of a methyl group in the 6α-position enhances the biological activity of the steroid compounds.

The present invention also relates to a method for the production of 6a,6a-dichloro-6,7-methylene and 6a,6a-dibromo-6,7-methylene derivatives of $\Delta^4$-3-keto-steroid compounds of the androstene and the pregnene series. This method comprises the step of reacting such a steroid compound, in which the 3-keto-group has been transformed to an enol ether group or a ketal group, with a tetrahalogenomethane in which the halogene is bromine or both chlorine and bromine.

When the 3-keto group is protected by transforming it into an enol ether group or a ketal group, the 4,5-double bond is displaced to the 5,6-position. The tetrahalogenomethane attacks the 5,6-double bond, primarily under formation of a 6-trihalogenomethyl derivative. These derivatives are more or less instable and are slowly transformed into the corresponding 6a,6a-dihalogen derivatives, and rapidly in the presence of an acid-binding substance. In some cases it is possible to isolate the 6-trihalogenomethyl derivative from the reaction mixture.

Generally, the reaction of the steroid compound with the tetrahalogenomethane will proceed slowly at room temperature, at least if the reaction mixture is exposed to diffuse daylight. However, the reaction is greatly accelerated by irradiation with light of wave lengths between 2000 and 8000 Angstrom. For the irradiation an ordinary electric incandescent lamp or a quartz-mercury lamp of a suitable size can be used.

It has moreover been found that the reaction is catalyzed by acid-binding substances, such as pyridine and collidine, by organic peroxides or by the presence of metallic magnesium in the reaction mixture. The tetrahalogenomethane used as a reactant can also serve as solvent for the steroid compound and as a medium for the reaction. In some cases a mixture of the tetrahalogenomethane and an inert solvent of a suitable boiling point, for example dioxane, is preferable. Likewise, when an organic base, such as pyridine or collidine is used as an acid-binding substance, the base can also be used as reaction medium, either alone or in mixture with an inert organic solvent.

The desired 6a,6a-dihalogeno-6,7-methylene steroid compound can be isolated from the reaction mixture by evaporating the mixture to dryness. From the residue the desired substance can in many cases be obtained by recrystallization. In other cases it is preferable to dissolve the residue in an inert solvent and remove the impurities by adsorption, or to isolate the desired compound from the solution by chromatography.

The $\Delta^4$-3-keto-6a,6a-dihalogeno-6,7-methylene steroids of the invention include the 6a,6a-dichloro-6,7-methylene and 6a,6a-dibromo-6,7-methylene derivatives of $\Delta^4$-3-keto-17β-hydroxy-androstenes, 19-nor-testosterone, progesterone, 17α-hydroxy-progesterone, 17α-hydroxy-11-desoxy-corticosterone, cortisone, and their acetates.

The starting materials used in the method according to the invention are ketals and enol ethers of $\Delta^4$-3-keto-steroids. The production of the said ketals has been described by H. J. Dauben et al. in J.A.C.S., 76, 1359, and the production of the ethyl enol ether of compound S and cortisone has been described by P. L. Julian et al. in J.A.C.S., 73, 1984.

Other of the 3-ethyl enol ethers of the $\Delta^4$-3-keto-steroid compounds are hitherto unknown substances. However, they can be produced by the method for the production of $\Delta^4$-androstene-3,17-dione-3-ethylenol ether described in Berichte der Deutschen Chemischen Gesellschaft, vol. 71, page 1769 (1938).

The production of the hitherto unknown ethyl enol ethers of $\Delta^4$-3-keto-steroids according to the above method, or the production of known ethyl enol ethers, which have not previously been produced according to the said method, is effected in the following manner:

PREPARATION OF TESTOSTERONE-3-ETHYL ENOL ETHER

Testosterone (37 g.) was dissolved in dry benzene (130 ml.), and after addition of the ethylester of orthoformic acid (22 g.), ethanol (18 g.) and p-toluenesulfonic acid (300 mg.) as a catalyst, the mixture was boiled under reflux for 2 hours. After cooling to 20° C. a solution of potassiumhydroxide (4 g.) in methanol (80 ml.) was added. Thereafter the solution was poured into one liter of water, and the resulting mixture extracted with ether (1.5 l.). The ethereal phase was collected, dried with $Na_2SO_4$ and evaporated in vacuo. The residue was recrystallized from methanol (250 ml.) containing a trace of pyridine. Thereby the desired compound was isolated with a M.P. of 113–115° C. and a yield of 30–33 g. By subsequent recrystallization from methanol the substance was isolated with a M.P. of 123–126° C. The U.V. spectrum showed an absorption maximum at 241 mμ ($\epsilon$=15,100).

PREPARATION OF 17α-METHYL-TESTOSTERONE-3-ETHYLENOL ETHER

Following the procedure hereinbefore described, but substituting the 17α-methyl testosterone for testosterone, the corresponding ethylenol ether of 17α-methyl-testosterone-3-ethylenol ether was obtained with a M.P. of 98–99° C. The U.V. spectrum showed an absorption maximum at 241 mμ ($\epsilon$=15,000).

PREPARATION OF PROGESTERONE-3-ETHYLENOL ETHER

Progesterone (104 g.) and a catalytic amount of p-toluenesulfonic acid (0.5 g.) was dissolved in benzene (800 ml.). Thereafter, 150 ml. of the benzene were distilled off, and a mixture of orthoformic acid triethyl ester (54.5 ml.) and 99.9% ethanol (50 ml.) was added. The boiling was repeated under reflux for 3 hours, whereafter 200 ml. of the benzene were distilled off. After addition of pyridine (5 ml.), the mixture was evaporated in vacuo. The residue was recrystallized from hot methanol, and after cooling the enol ether was collected, washed with methanol and dried. Thereby 60 g. of the desired substance were obtained with a M.P. of 98–100° C. By subsequent recrystallization from methanol containing ½% of pyridine, 55% of the enol ether were obtained with a M.P. of 101–103° C.

*Analysis.*—Calculated: C, 80.65; H, 10.01. Found: C, 80.56; H, 10.04.

PREPARATION OF 17-HYDROXY-PROGESTERONE-3-ETHYL ENOL ETHER

Following the method described above, but substituting 17-hydroxy-progesterone for progesterone, the corresponding ethyl enol ether of 17-hydroxy-progesterone was obtained with a M.P. of 172–175° C.

PREPARATION OF DESOXYCORTICOSTERONE-21-ACETATE-3-ETHYLENOL ETHER

Desoxycorticosterone-21-acetate (5 g.) was dissolved in dioxane (36 ml.), whereafter orthoformic acid triethyl ester (5 ml.) and 99.9% ethanol (0.36 ml.) were added. Furthermore, 1.42 ml. of a solution of 0.67 ml. of conc. sulfuric acid in 135 ml. of dioxane was added, and the mixture was left standing for 30 minutes at a temperature not exceeding 35° C. After neutralizing the reaction mixture by addition of pyridine (3.3 ml.), it was evaporated in vacuo, and the residue recrystallized from 15 ml. of methanol. Thereby 4.2 g. of the desired substance were obtained with a M.P. of 138–140° C. The U.V. spectrum showed an absorption maximum at 241 mμ ($\epsilon$=15,100).

EXAMPLE 1

*6a,6a-Dibromo-6,7-Methylene-Testosterone*

31.6 of testosterone-3-ethylenol ether were dissolved in 250 ml. of freshly distilled 2,4,6-collidine. 66.4 g. of tetra-bromo-methane were added, and after standing for 48 hours at room temperature, a precipitate consisting of collidine hydrobromide, $CBr_4$, was filtered off.

While stirring, the filtrate was poured into chilled dilute hydrochloric acid, and the crystalline 6-tribromomethyl-testosterone hereby precipitated was collected on a filter, triturated with ether, washed with methanol and dried at room temperature, whereby 45 g. of 6-tribromomethyl-testosterone were obtained with a M.P. of 215–216° C. (decomp.). The U.V. spectrum showed absorption maximum at 238 mμ ($\epsilon$=12,900), and the infrared (I.R.) spectrum (CHCl₃) maxima at 1600 and 1672 cm.⁻¹.

Calculated: C, 44.55; H, 5.05; Br, 44.47. Found: C, 44.60; H, 5.19; Br, 44.32.

5.39 g. of 6-tribromomethyl-testosterone prepared as described above, dissolved in 100 ml. of pyridine were heated on a steam bath for 30 minutes. After cooling, water was added and the crystalline precipitate was collected and recrystallized from ethanol yielding 4.05 g. of 6a,6a-dibromo-6,7-methylene-testosterone with a M.P. of 230–231° C. A sample obtained by further recrystallization from ethanol had a M.P. of 232–233° C. and $[\alpha]_D^{20}$=+210°. U.V. spectrum max. 250 mμ ($\epsilon$=10,400); I.R. spectrum (KBr): 1578, 1607 and 1660 cm.⁻¹.

Calculated: C, 52.42; H, 5.72; Br, 34.88. Found: C, 52.17; H, 5.72; Br, 34.88.

EXAMPLE 2

*6a,6a-Dibromo-6,7-Methylene-Testosterone Acetate*

9.5 g. of testosterone-3-ethylenol ether were dissolved in propylene oxide, 10 g. of tetra-bromo-methane were added and the resulting solution was exposed to direct sunlight. Shortly afterwards crystals began to separate. The reaction mixture was allowed to stand at room temperature for 5 hours, whereafter the crystals were collected and washed with ether yielding 5.7 g. of tribromomethyltestosterone with a M.P. of 213–216° C. and this substance was identical with that prepared by the method described in Example 1. The 6-tribromomethyltestosterone thus prepared was dissolved in 65 ml. of dry pyridine and 20 ml. of acetic acid anhydride were added. After standing overnight at room temperature the mixture was poured into 500 ml. of water. The precipitate was filtered off and recrystallized from ethanol, whereby 5.1 g. of the desired substance were obtained with a M.P. of 168–169° C. $[\alpha]_D^{20}$=+180°. I.R. spectrum 1570, 1605 and 1723 cm.⁻¹.

Calculated: C, 52.81; H, 5.64; Br, 31.95. Found: C, 52.99; H, 5.78; Br, 31.98.

EXAMPLE 3

*6a,6a-Dichloro-6,7-Methylene-Testosterone*

20 g. of testosterone 3-ethylenol ether were dissolved in 60 ml. of dioxane, 5 ml. of pyridine and 10 ml. of bromo-trichloro-methane were added to the solution, and the mixture was allowed to stand at room temperature for 20 hours. After filtration, the filtrate was poured into a large amount of water, whereby an oil separated out, which after decanting was triturated with ether. Thereby 12.5 g. of trichloromethyl-testosterone were obtained with a M.P. of 212–215° C. (decomp.). U.V. spectrum: max. 242 mμ ($\epsilon$=12,500).

Calculated: C, 59.19; H, 6.70; Cl, 26.21. Found: C, 59.87; H, 6.84; Cl, 26.90.

10 g. of 6-trichloromethyl-testosterone prepared as described above were dissolved in 150 ml. of pyridine, and the solution was heated on a steam bath for 30 minutes. After cooling, water was added, and by scratching the wall of the vessel with a spatula, the 6a,6a-dichloro-6,7-methylene testosterone crystallized. It was collected and recrystallized from ethanol. Thereby 7.6 g. of this substance were obtained with a M.P. of 208–210° C. and $[\alpha]_D^{20}$=+264°. U.V. spectrum: max. 246 mμ ($\epsilon$=10,400).

Calculated: C, 65.03; H, 7.08; Cl, 19.19. Found: C, 65.15; H, 7.20; Cl, 19.23.

EXAMPLE 4

*6a,6a-Dibromo-6,7-Methylene-Testosterone*

9.5 g. of testosterone 3-ethylenol ether were dissolved in 165 ml. of chloroform, and to the solution 9.6 g. of tetra-bromo-methane were added. The solution was boiled with reflux for 20 hours. During the boiling the solution was irradiated with a 500 watt photographic electric incandescent lamp (3,800° Kelvin). Thereafter, the solution was evaporated to dryness in vacuo, the residue was kneaded with 30 ml. of ethanol, and the crystals thereby formed were filtered off and recrystallized from ethanol. Thereby 5.4 g. of 6a,6a-dibromo-6,7-methylene-testosterone were obtained with a M.P. of 229–230° C. The U.V. spectrum of the substance showed an absorption maximum at 250 mµ ($\epsilon=10,400$), $[\alpha]_D^{20}=+210°$ (chloroform).

Calculated: C, 52.41; H, 5.71; Br, 34.88. Found: C, 52.37; H, 5.76; Br, 34.88.

By heating the same reaction mixture with reflux for 2 hours only 4.9 g. of the same substance were obtained from 9.5 g. of the starting material.

EXAMPLE 5

6a,6a-Dibromo-6,7-Methylene-Testosterone 3.3 g. of testosterone-3-ketal (3-ethylenedioxide-Δ⁵-androstene-17-ol) were dissolved in 50 ml. of chloroform, and 3.3 g. of tetrabromo-methane were added. The solution was boiled with reflux for 20 hours, and during the boiling the solution was irradiated with a 250 watt ordinary electric incandescent lamp. The reaction mixture was worked up in the manner described in Example 4. Thereby 920 mg. of 6-dibromo-methylene-testosterone were obtained with a M.P. of 229–230° C.

EXAMPLE 6

6a,6a-Dibromo-6,7-Methylene-Testosterone 3.2 g. of testosterone-3-ethylenol ether were dissolved in 50 ml. of dioxane, and to the solution 3.3 g. of tetrabromo-methane were added. The solution was boiled for 2 hours with reflux while irradiating it with a 500 watt photographic electric incandescent lamp (3,800° Kelvin). Thereafter the solution was evaporated to dryness in vacuo, and the residue was kneaded with 10 ml. of methanol. The solid substance thereby obtained was filtered off and recrystalized from methanol. Thereby 1.6 g. of 6a,6a-dibromo-6,7-methylene-testosterone were obtained with a M.P. 228–230° C.

EXAMPLE 7

The procedure described in Example 6 was repeated with the same amounts of the same substances, only that carbon tetrachloride was used instead of dioxane. Thereby 920 mg. of the desired dibromo-compound were obtained.

EXAMPLE 8

6a,6a-Dibromo-6,7-Methylene-Testosterone-17-Acetate 3.0 g. of 6a,6a-dibromo-6,7-methylene-testosterone were dissolved in 20 ml. of anhydrous pyridine, and to the solution was added 10 ml. of acetic acid anhydride. After standing for 24 hours at room temperature, the solution was evaporated to dryness in vacuo, and the residue was recrystallized from ether/petroleum ether. Thereby 2.9 g. of the desired acetate were obtained with a M.P. of 159–161° C., $[\alpha]_D^{20}=+194°$ (chloroform). The same acetate was also prepared from the 3-ethylenol ether of testosterone acetate by the method described in Example 2.

EXAMPLE 9

6a,6a-Dichloro-6,7-Methylene Testosterone 3.2 g. of testosterone 3-ethylenol ether were dissolved in 50 ml. of chloroform and 2.6 g. of dichloro-dibromomethane were added. The solution was boiled with reflux for 20 hrs. and during the boiling irradiated with a 500 watt photographic electric incandescent lamp (3,800° Kelvin). Thereafter the brown solution was evaporated to dryness in vacuo on a steam bath, and the fatty residue was kneaded with 25 ml. of ether. After standing for 1 hour the solid material was filtered off and dissolved in as small a quantity of methanol as possible. The solution thereby obtained was allowed to stand at 0° C. The crystals thereby formed were filtered off and dried. 2.0 g. of the 6a,6a-dichloro-6,7-methylene-testosterone were obtained with a M.P. of 210–211° C.

By evaporation of the methanolic mother liquor to dryness and recrystallization of the residue from ether, unreacted testosterone with a M.P. of 150–152° C. could be recovered.

EXAMPLE 10

6a,6a-Dichloro-6,7-Methylene Testosterone 3.3 g. of testosterone-3-ketal were dissolved in 50 ml. of trichloro-bromo-methane, and to the solution were added 200 mg. of magnesium strips (Grignard). The mixture was heated to 100° C. for 5 hours in darkness while stirring. Thereafter the magnesium strips were filtered off and the solution evaporated to dryness. The fatty residue was worked up as described in Example 4. Thereby 1.1 g. of the 6a,6a-dichloro-6,7-methylene-testosterone were obtained with a M.P. of 209–210° C.

Testosterone could be recovered from the mother liquor in the manner described in Example 9.

When boiling the reaction mixture with reflux for 20 hours instead of 2 hours, 2.4 g. of 6a,6a-dichloro-6,7-methylene-testosterone were obtained from 3.3 g. of testosterone-3-ketal.

By dissolving 3.3 g. of testosterone-3-ketal in 50 ml. of trichloro-bromo-methane and keeping the solution at room temperature for 24 hours, a yield of 470 mg. of the same compound was obtained. By irradiating the same solution for 24 hours at 18° C., with ultraviolet light, 800 mg. of the same compound were obtained from 3.3 of testosterone-3-ketal.

EXAMPLE 11

6a,6a-Dichloro-6,7-Methylene Testosterone 3.3 g. of testosterone-3-ketal were dissolved in 50 ml. of trichloro-bromo-methane, 250 mg. of benzoylperoxide were added, and the mixture was heated to 100° C. on a steam bath for 5 hours in darkness. By evaporating the reaction mixture to dryness and working up the residue as described in Example 9, a yield of 1.1 g. of the desired substance with a M.P. of 210–211° C. was obtained.

EXAMPLE 12

6a,6a-Dichloro-6,7-Methylene Testosterone 3.3 g. of testosterone-3-ketal were dissolved in 50 ml. of trichloro-bromo-methane, and to the solution was added 200 mg. of magnesium strips (Grignard). The mixture was heated to 100° C. for 5 hours in darkness while stirring. Thereafter, the magnesium strips were filtered off and the solution evaporated to dryness. The fatty residue was worked up as described in Example 9. Thereby 1.1 g. of the desired substance was obtained with a M.P. of 209–210° C.

EXAMPLE 13

6α,6α-Dibromo-6,7-Methylene-17α-Methyl Testosterone 12 g. of the 3-ethylenol ether of 17α-methyltestosterone were dissolved in a mixture of 65 ml. of anhydrous dioxane and 4 ml. of anhydrous pyridine, 12 g. of tetrabromomethane were added, and the solution was boiled under reflux for two hours and during the boiling irradiated with a 500 watt electric photographic incandescent lamp. After cooling, the undissolved matter was filtered off, and the filtrate evaporated to dryness in vacuo. The residue was dissolved in 5 ml. of anhydrous ethanol, and hexane was added until precipitation. Thereby 8 g. of the 6a,6a-dibromo-6,7-methylene - 17α - methyl-testosterone was obtained with a M.P. of 194–195° C. The U.V. spectrum showed max. at 251 mµ ($\epsilon=10,600$).

EXAMPLE 14

6a,6a-Dibromo-6,7-Methylene-19-Nor-testosterone-17-Acetate

The 6-tribromomethyl derivative was prepared in analogy to Example 1 and without purification converted into the 6a,6a-dibromo-6,7-methylene-19-nor-testosterone acetate in a yield of 35% by heating in pyridine as described in Example 1. After recrystallization from methanol, the substance was obtained with a M.P. of 146–147° C. U.V. spectrum showed max. 250 m$\mu$ ($\epsilon$=13,900).

Calculated: C, 51.86; H, 5.38; Br, 32.86. Found: C, 51.93; H, 5.38; Br, 32.79.

EXAMPLE 15

6a,6a-Dichloro-6,7-Methylene Progesterone 3.4 g. of progesterone-3-ethylenol ether were dissolved in 75 ml. of chloroform and 2.4 g. of dichloro-dibromo-methane were added. The mixture was boiled with reflux for 4 hours and during the boiling irradiated with a 500 watt photographic electric incandescent lamp (3800° Kelvin). Thereafter, the solution was evaporated to dryness in vacuo, the fatty residue was dissolved in 50 ml. of ether. The solution was passed through a column of $Al_2O_3$ having a diameter of 2 cm. and a height of 10 cm. whereafter the column was washed with 500 ml. of ether. The ethereal solution thereby obtained was evaporated to dryness, and the residue recrystallized from methanol. Thereby 1.65 g. of the desired substance were obtained with a M.P. of 168–170° C. The U.V. spectrum showed max. at 246 m$\mu$ ($\epsilon$=11,000).

Calculated: C, 66.83; H, 7.11; Cl, 17.90. Found: C, 67.09; H, 7.21; Cl, 17.85.

EXAMPLE 16

6α,6α-Dichloro-6,7-Methylene-Progesterone 4.0 g. of progesterone-3,20-diethyleneglycolketal were dissolved in 75 ml. of trichloro-bromo-methane. The solution was boiled with reflux for 2 hours and during the boiling irradiated with a 500 watt photographic electric incandescent lamp (3800° Kelvin). Thereafter, the reaction mixture was evaporated to dryness in vacuo, the residue was dissolved in 100 ml. of acetone, and in order to remove the ketal group in the 20-position, 10 ml. of 8% sulphuric acid were added, and the solution boiled with reflux for 1 hour. Thereafter the solution was diluted with 500 ml. of ether. The ethereal phase was washed with 200 ml. of water three times, dried with $Na_2SO_4$ and evaporated to dryness. By recrystallization from methanol 450 mg. of the desired substance were obtained with a M.P. of 166–170° C.

EXAMPLE 17

6α,6α-Dichloro-6,7-Methylene-Progesterone 34.2 g. of progesterone-3-ethylenol ether were dissolved in a mixture of 200 ml. of anhydrous dioxane and 16.1 ml. of pyridine. 66.4 g. of tetrabromo-methane were added, and the resulting yellow solution was left standing at room temperature for 24 hours.

A crystalline precipitate consisting of an addition compound of one mole pyridine hydrobromide and one mole tetra-bromo-methane was filtered off, and the filtrate was heated on a steam bath for 3–4 hours. After cooling, a precipitate mainly consisting of pyridine hydrobromide was filtered off, the filtrate was diluted with 500 ml. of ether, washed thoroughly with water and dried, whereafter the solvent was distilled off in vacuo. The residue crystallized by addition of methanol, and the crude product thereby obtained was recrystallized from methanol, whereby 6a,6a-dibromo-6,7-methylene progesterone with a M.P. of 201–202° C. was obtained in a yield of 36%.

$$[\alpha]_D^{22} = +242°$$

The U.V. spectrum showed a max. at 250 m$\mu$ ($\epsilon$=9,750) and a shoulder at 285 m$\mu$ ($\epsilon$=5,600). I.R. spectrum ($CHCl_3$): 1570, 1622 and 1700$^{-1}$.

Calculated: C, 54.56; H, 5.83; Br, 33.01. Found: C, 54.48; H, 5.82; Br, 32.95.

EXAMPLE 18

6a,6a-Dibromo-6,7-Methylene Progesterone 12.0 g. of progesterone-3-ethylenol ether were dissolved in 300 ml. of chloroform and 11.5 g. of tetrabromo-methane were added. The solution was boiled with reflux for 4 hours and during the boiling irradiated with a 500 watt photographic electric incandescent lamp (3800° Kelvin). Thereafter the solution was evaporated to dryness in vacuo, and the residue was dissolved in 200 ml. of ether. The solution was passed through a column of $Al_2O_3$ having a diameter of 3 cm. and a height of 15 cm., after which the column was washed with 1 liter of ether. The ether phase was evaporated and the residue recrystallized from ether. Thereby 7.0 g. of the desired substance were obtained with a M.P. of 195–196° C.

EXAMPLE 19

6α,6α-Dibromo-6,7-Methylene-17α-Acetoxy Progesterone 2.87 g. of 17α-hydroxyprogesterone-3-ethylenol ether were dissolved in a mixture of 20 ml. of anhydrous dioxane and 2 ml. of anhydrous pyridine. 5.30 g. of tetrabromo-methane were added, and the solution was left standing at room temperature for 3½ hours exposed to diffuse daylight. The precipitate formed, which is believed to be a complex of tetrabromo-methane and pyridine hydrobromide, was filtered off, and the filtrate was boiled under reflux for 1 hour. After cooling and filtering off a precipitate which substantially consisted of pyridine hydrobromide, the filtrate was poured into an aqueous solution of ammonium sulphate, and the resulting mixture was extracted several times with ether. The combined ether extracts were washed with an aqueous solution of ammonium sulphate and dried, whereafter the solvent was distilled off in vacuo. The oily residue was dissolved in a mixture of 20 ml. of methanol and 1.5 ml. 4 N $H_2SO_4$, and the resulting solution was boiled with reflux for 30 minutes. After cooling, the crystals formed were filtered off and washed with methanol, and subsequently with ether. After two recrystallizations from acetone the 6a,6a-dibromo-6,7-methylene-17α-hydroxy-progesterone was obtained in substantially pure state with a M.P. of 230.5–231° C.

After recrystallization from methylcellosolve the substance was obtained in a modification with a M.P. of 246–247° C. $[\alpha]_D^{22}=+169°$ (chloroform). U.V. spectrum max. 252 m$\mu$ ($\epsilon$=10,250).

Calculated: C, 52.81; H, 5.64; Br, 31.95. Found: C, 52.64; H, 5.97; Br, 31.79.

From the compound thus produced the 17α-acetate was prepared as follows:

2.34 g. of 6a,6a-dibromo-6,7-methylene-17α-hydroxy-progesterone were suspended in a mixture of 60 ml. of glacial acetic acid and 15 ml. of acetic acid anhydride. 2.30 g. of p-toluenesulphonic acid were added, and the mixture was shaken for 16 hours at room temperature. The resulting clear solution was poured into 500 ml. of water, and the precipitate thereby formed was filtered off, washed with water and dried over $P_2O_5$. By recrystallization from benzene/hexane, 2.48 g. (97% yield) of the desired compound, which crystallized with one mole of benzene, were obtained with a M.P. of 114–117° C. and $[\alpha]_D^{20}=+143°$ (chloroform). U.V. spectrum showed max. at 249 m$\mu$ ($\epsilon$=10,200) and a shoulder at 280–285 m$\mu$ ($\epsilon$=6,200).

Calculated: C, 58.00; H, 5.85; Br, 25.80. Found: C, 58.14; H, 6.06; Br, 25.72.

EXAMPLE 20

6a,6a-Dibromo-6,7-Methylene-11-Desoxycorticosterone Acetate

This compound was obtained in analogy to the 6-dibromo-methylene-testosterone from the 3-ethylenol ether of 11-desoxycorticosterone-21-acetate, the method of Example 2 being used for the preparation of the intermediate 6-tribromomethyl derivative, which without purification was converted to the desired compound in a yield of 45% by heating in pyridine as described in Example 2. After recrystallization from methanol, the desired substance had a M.P. of 176–177° C. U.V. spectrum: max. at 250 m$\mu$ ($\epsilon$=11,400).

Calculated: C, 53.16; H, 5.58; Br, 29.46. Found: C, 52.91; H, 5.69; Br, 29.31.

EXAMPLE 21

*6a,6a-Dibromo-6,7-Methylene-Desoxycorticosterone-21-Acetate*

By reacting 4.0 g. of the 3-ethylenol ether of desoxycorticosterone-21-acetate dissolved in 75 ml. of chloroform with 3.3 g. of tetrabromo-methane and working up the reaction mixture in the same manner as described in Example 18, a residue was obtained from which 1.0 g. of the desired substance was obtained by recrystallization from a mixture of equal volumes of ether and methanol. The M.P. of the product was 169–170° C.

EXAMPLE 22

*6a,6a-Dibromo-6,7-Methylene-17α-Hydroxy-11-Desoxycorticosterone-21-Acetate*

46 g. of the 3-ethylenol ether of 17α-hydroxy-11-desoxycorticosterone 21-acetate were dissolved in a mixture of 200 ml. of anhydrous dioxane and 20 ml. of pyridine, 73 g. of tetrabromo-methane were added, and the solution was left standing at room temperature for 16 hours. The precipitate formed was filtered off, and the filtrate was boiled with reflux for 2 hours. After cooling and filtering off a further precipitate, the solution was diluted with 500 ml. of ether, washed with water, dried and concentrated by evaporation in vacuo. The oily residue was dissolved in hot methanol, and after cooling the precipitated crude product was collected on a filter. By recrystallization from 2-methoxyethanol, the desired substance was obtained in substantially pure state with a M.P. of 228–229.5° C. U.V. spectrum max. at 251 m$\mu$ ($\epsilon$=9,950) and a shoulder at 280–285 m$\mu$ ($\epsilon$=5,800).

Calculated: C, 51.63; H, 5.42; Br, 28.63. Found: C, 51.61; H, 5.49; Br, 28.70.

EXAMPLE 23

*6a,6a-Dibromo-6,7-Methylene-Cortisone-21-Acetate*

Following the procedure of Example 17, but substituting the 3-ethylenol ether of cortisone acetate for the progesterone-3-ethylenol ether, a crude product of the desired substance was obtained. It was purified by dissolving in hot acetone, whereafter, upon cooling, the impurity separated out as needles (cortisone acetate). By addition of water to the filtrate the desired substance separated out. It was recrystallized from methyl-cellosolve, whereby the substance was obtained in a yield of 55% and with a M.P. of 236–237° C. $[\alpha]_D^{20}=+256°$ (chloroform). The U.V. spectrum showed max. at 252 m$\mu$ ($\epsilon$=9,650) and a shoulder at 275–280 m$\mu$ ($\epsilon$=5,250). I.R. spectrum (CHCl$_3$): 1570, 1607, 1668, 1703, 1720 and 1735 cm.$^{-1}$.

Calculated: C, 50.37; H, 4.93; Br, 27.94. Found: C, 50.27; H, 5.12; Br, 27.96.

EXAMPLE 24

*6a,6a-Dibromo-6,7-Methylene-Cortisone-21-Acetate*

60.0 g. of the 3-ethylenol ether of cortisone acetate were dissolved in 300 ml. of anhydrous dioxane, and to the solution were added 60.0 g. of tetrabromo-methane and 30 ml. of anhydrous pyridine. The mixture was boiled with reflux for 2 hours and during the boiling irradiated with a 250 watt photographic electric incandescent lamp (2800° Kelvin). The pyridine was added in order to bind the hydrogen bromide which is formed by the reaction and for the main part is retained in a medium of the composition used. After cooling, the undissolved matter, mainly consisting of pyridine hydrobromide, was filtered off, and the filtrate exaporated to dryness in vacuo. The residue was dissolved in ether and the ethereal solution washed with water, dried with MgSO$_4$ and evaporated to dryness. The residue was treated with petroleum ether in order to remove an excess of tetrabromo-methane, and the remaining solid matter containing 65 g. of dry substance was dissolved in hot methanol. After the solution had been left standing overnight, 20.0 g. of cortisone acetate were filtered off. The filtrate was evaporated to dryness in vacuo and the residue dissolved in hot acetone. After cooling the solution and filtering off a small amount of cortisone acetate, water was added, whereby 19.0 g. of the 6a,6a-Dibromo-6,7-Methylene-cortisone-acetate were precipitated. The crude product had a M.P. of 226–228° C. By recrystallization from ethyl acetate 16.0 g. of the substance were obtained with a M.P. of 232–234° C. By a further recrystallization from ethyl acetate, the M.P. was raised to 234–235° C.

EXAMPLE 25

*20-Ethyleneglycolketal of 6a,6a-Dibromo-6,7-Methylene-Cortisone-Acetate*

3.8 g. of the 3-ethylenol ether of the 20-ethyleneglycolketal of cortisone acetate were dissolved in 40 ml. of anhydrous dioxane, and to the solution was added 2.66 g. of tetrabromo-methane and 0.64 ml. of pyridine. The mixture was boiled with reflux for 3 hours and during the boiling irradiated with a 250 watt photographic electric incandescent lamp (2800° Kelvin). The precipitate thereby formed was filtered off and the filtrate evaporated to a syrup in vacuo. This residue was dissolved in 100 ml. of ether, and the ethereal solution washed twice with an equal volume of water, dried with MgSO$_4$ and evaporated to dryness. The residue was dissolved in 50 ml. of benzene and chromatographed on a column of 100 g. of silica gel (200–300 mesh). For the elution was at first used pure benzene, and thereafter a mixture of 1 volume part of ethanol and 99 volume parts of benzene. The fractions of the eluate obtained with this mixture, and which by means of paper chromatography were found to contain the desired substance, were combined, and the solution was evaporated to dryness. By kneading the residue with ether the desired substance crystallized. Yield: 1.6 g. with a M.P. of 196–200° C. By recrystallization from methanol, 1.1 g. were obtained with a M.P. of 210–211° C. The U.V. spectrum of the substance (in ethanol) showed a max. at 252 m., ($\epsilon$=9900) and a shoulder at 275–280 m$\mu$ ($\epsilon$=5900).

Calculated: C, 50.66; H, 5.24. Found: C, 50.84; H, 5.45.

The 6a,6a-dihalogeno-6,7-methylene steroid compounds produced as described in the examples can be converted into the corresponding 6α-methyl steroid compounds by the methods described below:

(1) PREPARATION OF 6α-METHYL-TESTOSTERONE

A palladium catalyst was prepared in the following manner: 4 g. of palladium chloride were dissolved in 8 ml. of concentrated hydrochloric acid, and the solution was diluted with 800 ml. of water. Strontium carbonate was added in small amounts while shaking, until the CO$_2$-evolution had stopped. 120 g. of strontium carbonate were then added, and the mixture was shaken mechanically overnight. The solid was filtered off, washed thoroughly with distilled water, then with methanol and ether, and finally dried at 50° C.

6.0 g. of the catalyst thus prepared were suspended in 50 ml. of peroxide-free, anhydrous dioxane and hydrogenated at atmospheric pressure and room temperature. Thereafter a solution of 9.17 g. of 6a,6a-dibromo-6,7- methylene-testosterone prepared by the method described in Example 1 and 5.6 ml. of pure triethylamine in 200 ml. of peroxide-free, anhydrous dioxane was added, and the hydrogenation was continued. In the course of 1 hour, 1440 ml. of hydrogen were absorbed, corresponding to 3 mols of $H_2$ per mole of the steroid, whereafter the absorption ceased completely. The catalyst was then filtered off and the filtrate evaporated in vacuo at a temperature not exceeding 40° C. The solid, light yellow, fatty residue was recrystallized from 30 ml. of ether and dried. 4.55 g. of the hydrogenation substance were obtained with a M.P. of 150–152° C.

4.5 g. of this substance were dissolved in 100 ml. of ethanol, and to the solution were added 10 ml. of 1 N HCl. The solution was allowed to stand for 18 hours in the course of which it assumed a strong blue colour. A saturated solution of $NaHCO_3$ was added until neutral reaction, and the blue colour disappeared. The solution was evaporated to a small volume and the concentrated solution extracted with 200 ml. of ether. The ethereal solution was dried with $Na_2SO_4$ and evaporated in vacuo to dryness. The residue was recrystallized from 10 ml. of ethanol and subsequently from 8 ml. of acetone. 3.8 g. of 6α-methyl-testosterone were obtained with a M.P. of 157–158° C. The ultraviolet spectrum showed a maximum at 242 m$\mu$ ($\epsilon$=15,800).

(2) PREPARATION OF 6α-METHYL-TESTOSTERONE 9.17 g. of 6a,6a-dibromo-6,7-methylene-testosterone prepared by the method described in Example 1 were hydrogenated as described in preparation 1. After hydrogenation the catalyst was filtered off and to the filtrate were added 2 ml. of 4 N HCl, whereafter the solution was left standing at room temperature for 2 hours. The solution was evaporated in vacuo to a volume of 15 ml. and subsequently diluted with 300 ml. of water. The substance thereby precipitated was filtered off and washed with water, dried and recrystallized from 10 ml. of ethanol. Thereby 4.3 g. of 6α-methyl-testosterone were obtained with a M.P. of 157–158° C.

(3) PREPARATION OF 6α-METHYL-TESTOSTERONE 7.38 g. of 6a,6a-dichloro-6,7-methylene-testosterone prepared by the method described in Example 3 were dissolved in 100 ml. of dioxane and 5.6 ml. of triethylamine were added. The mixture was hydrogenated at atmospheric pressure and room temperature after adding 6 g. of a prereduced palladium catalyst containing 2% palladium on strontium carbonate. In the course of 45 minutes 3 mols of hydrogen were absorbed (1.440 ml.). The catalyst was removed and the filtrate acidified with 10 ml. of 4 N HCl. After standing for 15 minutes at room temperature, the pH was adjusted to 7.0 by addition of a solution of sodium carbonate, whereafter the dioxane was removed by distillation in vacuo. During the evaporation the 6a,6a-methyl-testosterone crystallized. After cooling it was filtered off and recrystallized from 16 ml. of 60% acetone to give 4.7 g. of the desired substance with a M.P. of 156–158° C. U.V. spectrum max. at 242 m$\mu$ ($\epsilon$=14,900).

(4) PREPARATION OF 6α-METHYL-TESTOSTERONE 302 mg. of 6a,6a-dibromo-6,7-methylene-testosterone prepared by the method described in Example 4 were dissolved in 20 ml. of dioxane and 0.173 ml. of triethylamine were added. The mixture was hydrogenated in the presence of 100 mg. of a prereduced platinum oxide catalyst. During 45 minutes 72 ml. of hydrogen were absorbed, whereafter the mixture was worked up as indicated in the above preparations to give a 60% yield of the desired substance.

(5) PREPARATION OF 6α-METHYL-TESTOSTERONE 302 mg. of 6a,6a-dibromo-6,7-methylene-testosterone prepared by the method described in Example 4 were dissolved in 20 ml. of dioxane and 0.173 ml. of triethylamine were added. The mixture was hydrogenated in the presence of 100 mg. of a palladium catalyst containing 5% palladium on active carbon. During 25 minutes 72 ml. of hydrogen were absorbed. The mixture was worked up as described in the above preparation 3 to give the desired substance.

(6) PREPARATION OF 6α-METHYL-TESTOSTERONE 302 mg. of 6a,6a-dibromo-6,7-methylene-testosterone prepared by the method described in Example 5 were dissolved in 20 ml. of dioxane and 0.175 ml. of triethylamine were added. The mixture was hydrogenated in the presence of 200 mg. of Raney-nickel at atmospheric pressure and room temperature. During 35 minutes 73 ml. of hydrogen were absorbed, whereafter the reaction mixture was worked up as described in the above preparation 3 to give 6α-methyl-testosterone in a yield of 50%.

(7) PREPARATION OF 6α-METHYL-19-NOR-TESTOSTERONE-17-ACETATE 9.5 g. of 6a,6a-dibromo-6,7-methylene-19-nor-testosterone-17-acetate prepared as described in Example 14 were dissolved in 100 ml. of dioxane, and 5.6 ml. of triethylamine were added. 6 g. of a prereduced palladium catalyst containing 2% palladium on strontium carbonate were added, whereafter the mixture was hydrogenated at atmospheric pressure and room temperature. During 45 minutes 3 mols of hydrogen were absorbed. The catalyst was filtered off and the filtrate worked up as described in preparation 1. The crude product was recrystallized from petroleum ether/ether (2:1) to give 4.7 g. of the desired substance with a M.P. of 126–128° C. U.V. spectrum max. at 241 m$\mu$ ($\epsilon$=15,000), $[\alpha]_D^{20}$=+8°.

(8) PREPARATION OF 6α-METHYL-PROGESTERONE 14.53 g. of 6a,6a-dibromo-6,7-methylene progesterone prepared in the manner described in Example 17 were dissolved in 200 ml. of 2-methoxy-ethanol, whereafter 8.4 ml. of triethylamine were added. In the presence of 20 g. of a prereduced palladium catalyst containing 2% palladium on strontium carbonate the mixture was hydrogenated at atmospheric pressure and room temperature. During 1½ hours 3 mols of hydrogen were absorbed, whereafter the consumption of hydrogen ceased. The catalyst was filtered off and the filtrate acidified by addition of 1 N HCl. After standing for 1 hour at room temperature water was added. By scratching on the wall of the vessel with a spatula, the product crystallized, whereafter it was collected on a filter, washed with dilute methanol and dried. By recrystallization from hexane, 7.1 g. of the pure 6α-methyl-progesterone with a M.P. of 122–123.5° C. were obtained. The U.V. spectrum showed max. at 242 m$\mu$ ($\epsilon$=16,200), $[\alpha]_D^{20}$=+177°.

(9) PREPARATION OF 6α-17α-DIMETHYL-TESTOSTERONE 8.5 g. of 6a,6a-dibromo-6,7-methylene-17α-methyltestosterone prepared in the manner described in Example 13 were dissolved in 175 ml. of dioxane, and 5 ml. of triethylamine were added. The solution was mixed with 5 g. of a prereduced palladium catalyst containing 2% palladium on strontium carbonate and the mixture was shaken with hydrogen at atmospheric pressure and room temperature. During 30 minutes 1285 ml. of hydrogen were absorbed. The catalyst was filtered off and the filtrate acidified with 5 ml. of 2 N HCl. The solution was left standing at room temperature for 15 minutes, neutralized with aqueous $NaHCO_3$ and evaporated in vacuo to a small volume. The residue was extracted with ether and the ethereal solution was dried and evaporated in vacuo.

The residue was recrystallized from a mixture of 90% ether and 10% petroleum ether (boiling range 40–60° C.). Thereby, 4.2 g. of the desired substance was obtained with a M.P. of 136–137° C. U.V. spectrum max. at 241 m$\mu$ ($\epsilon$=15,000), $[\alpha]_D^{20}$=+66° (1% in $CHCl_3$).

(10) PREPARATION OF 6α-METHYL-17α-ACETOXY-PROGESTERONE 2.0 g. of a palladium catalyst prepared in the manner described in the above preparation 1 were suspended in 15 ml. of anhydrous dioxane and hydrogenated at atmospheric pressure. Thereafter a solution of 2.47 g. of 6a,6a-dibromo-6,7-methylene-17α-acetoxy - progesterone, prepared by the method described in Example 19, in a mixture of 20 ml. of anhydrous dioxane and 1.3 ml. of triethylamine was added, and the hydrogenation was continued by shaking the mixture with hydrogen at atmospheric pressure. When 3 mols of hydrogen per mole of the steroid compound had been absorbed, the catalyst was filtered off and the filtrate acidified with 1 ml. of 4 N HCl. After standing for 1 hour the hydrogenation product was precipitated by addition of water, and the precipitate was filtered off and washed with water. Thereby 1.30 g. of the desired substance was obtained with a M.P. of 190–195° C. By recrystallization from isopropanol the M.P. was raised to 205–207° C. U.V. spectrum max. at 241 mμ ($\epsilon$=15,550) (in ethanol). $[\alpha]_D^{22}$=+60.8° (1% in $CHCl_3$).

Applying the procedure described above, but substituting the caproate, the phenylacetate, the propionate or the β-cyclopentyl-propionate of 6a,6a-dibromo-6,7-methylene-17α-hydroxy-progesterone for 6a,6a-dibromo-6,7-methylene-17α-acetoxy-progesterone, the corresponding ester of 6α-methyl-17α-hydroxy-progesterone is obtained with a M.P. of 105–107° C. and $[\alpha]_D^{20}$=+46° for the caproate, M.P. 164–166° C. and $[\alpha]_D^{20}$=+62° for the phenylacetate, M.P. 155–157° C. and $[\alpha]_D^{20}$=+45° for the propionate and finally M.P. 135–137° C. and $[\alpha]_D^{20}$=+44° for the β-cyclopentylpropionate.

(11) PREPARATION OF 6α-METHYL-17α-HYDROXY-11-DESOXY-CORTICOSTERONE-21-ACETATE 8 g. of a catalyst prepared as described in the above preparation 1 were suspended in 60 ml. of 2-methoxy-ethanol and hydrogenated at atmospheric pressure and room temperature. Thereafter, a solution of 9.0 g. of 6a,6a - dibromo - 6,7 - methylene - 17α - hydroxy - 11-desoxy-corticosterone-21-acetate prepared by the method described in Example 22 and 4.5 ml. of triethylamine in 75 ml. of 2-methoxy-ethanol were added, and the hydrogenation was continued. During 1 hour 1160 ml. of hydrogen (3.0 mols per mole of the steroid compound) were absorbed, whereafter the absorption ceased. The catalyst was filtered off, 1.5 ml. of 4 N HCl were added, and the solution was left standing at room temperature for 30 minutes. The desired substance was precipitated by addition of water and dried. 5.3 g. of the substance were obtained with a M.P. of 193–194° C. After recrystallization from acetone/hexane the M.P. was 198.5–200° C.

Calculated: C, 71.57; H, 8.87. Found: C, 71.23; H, 8.64.

(12) PREPARATION OF 6α-METHYL-CORTISONE-ACETATE 5.0 g. of a catalyst prepared as described in the above preparation 1 were suspended in 40 ml. of 2-methoxy-ethanol and hydrogenated at atmospheric pressure and room temperature. Thereafter, a solution of 5.72 g. of 6a,6a - dibromo-6,7-methylene-cortisone-acetate prepared by the method described in Example 23 and 2.8 ml. of triethylamine in 50 ml. of 2-methoxy-ethanol were added, and the hydrogenation was continued. During 1 hour 740 ml. of hydrogen (3.08 mols per mole steroid) were absorbed. Towards the end of this period, the rate of absorption had decreased to about 2% of the initial rate. The catalyst was filtered off and 1 ml. of 4 N HCl was added, whereafter the solution was left standing for 30 minutes under nitrogen at room temperature. By addition of water the desired compound was precipitated from the solution. 3.58 g. of the dry substance were obtained.

After recrystallization from abs. ethanol the product had a M.P. of 232–237° C., and after further recrystallization from abs. ethanol, 237–238° C. U.V. spectrum max. at 238 mμ ($\epsilon$=15,000).

Calculated: C, 69.21; H, 7.74. Found: C, 68.99; H, 7.90.

(13) PREPARATION OF 6α-METHYL-CORTISONE-ACETATE 17.2 g. of 6a,6a-dibromo-6,7-methylene-cortisone acetate prepared in the manner described in Example 24 were dissolved in a mixture of 300 ml. of 2-ethoxy ethanol and 9 ml. of triethylamine and hydrogenated at room temperature and atmospheric pressure in the presence of 10 g. of the commercially available palladium catalyst containing 5% palladium on calcium carbonate. When 3 mols of hydrogen per mole of the steroid compound had been absorbed, the catalyst was filtered off and the filtrate acidified with 5 ml. of 4 N HCl. After standing for 30 minutes under nitrogen at room temperature the reaction product was precipitated by addition of water. Thereby 10.5 g. of the desired substance were obtained with a M.P. of 234–235.5° C. By one recrystallization from abs. ethanol a substantially pure product was obtained with a M.P. of 237–239° C. and $[\alpha]_D^{22}$=+204° (1% in $CHCl_3$).

What we claim is:

1. As an intermediate in the porduction of 6-methyl steroids, a member of the group consisting of
    $\Delta^4$-3-keto-6a,6a-dichloro-6,7-methylene androstenes,
    $\Delta^4$-3-keto-6a,6a-dibromo-6,7-methylene androstenes,
    $\Delta^4$-3-keto-6a,6a-dichloro-6,7-methylene pregnenes, and
    $\Delta^4$-3-keto-6a,6a-dibromo-6,7-methylene pregnenes.
2. 6a,6a-dichloro-6,7-methylene-testosterone.
3. 6a,6a-dichloro-6,7-methylene-testosterone acetate.
4. 6a,6a-dibromo-6,7-methylene-testosterone.
5. 6a,6a-dibromo-6,7-methylene-testosterone acetate.
6. 6a,6a-dibromo-6,7-methylene - 17α-methyltestosterone.
7. 6a,6a-dibromo-6,7-methylene-11 - desoxy - corticosterone.
8. 6a,6a-dibromo-6,7-methylene-11-desoxy - corticosterone 21-acetate.
9. 6a,6a - dibromo-6,7-methylene-11-desoxy-17α - hydroxy-corticosterone.
10. 6a,6a-dibromo-6,7-methylene-11-desoxy - 17α - hydroxy-corticosterone 21-acetate.
11. 6a,6a-dibromo-6,7-methylene-cortisone.
12. 6a,6a-dibromo-6,7-methylene-cortisone 21-actetate.
13. 6a,6a - dibromo-6,7-methylene-cortisone - 20-ethylene-glycolketal.
14. 6a,6a-dibromo-6,7-methylene-17α-hydroxy - progesterone.
15. 6a,6a-dibromo-6,7-methylene-17α - hydroxy-progesterone 17-acetate.
16. A method for the production of 6a,6a-dichloro-6,7-methylene and 6a,6a-dibromo-6,7-methylene derivatives of $\Delta^4$-3-keto steroid compounds of the androstene series and the pregnene series, which comprises reacting a compound selected from the group consisting of 3-enol ethers of androstenes, 3-enol ethers of pregnenes, 3-ketals of androstenes and 3-ketals of pregnenes with a tetrahalogenomethane selected from the group consisting of tetrabromomethane and tetrahalogenomethane containing both chlorine and bromine.

References Cited in the file of this patent
FOREIGN PATENTS
581,325     Belgium _____ Nov. 30, 1959